United States Patent
Stiles et al.

(10) Patent No.: US 8,119,950 B2
(45) Date of Patent: Feb. 21, 2012

(54) LASER APPARATUS FOR HARD SURFACE COATINGS

(75) Inventors: Eric Stiles, Ann Arbor, MI (US); Thomas Himmer, Ann Arbor, MI (US); James E. Herbison, Edmonton (CA); Anja Techel, Dresden (DE)

(73) Assignees: Fraunhofer USA, Plymouth, MI (US); Fraunhofer IWS, Dresden (DE)

( * ) Notice: Subject to any disclaimer, the term of this patent is extended or adjusted under 35 U.S.C. 154(b) by 102 days.

(21) Appl. No.: 12/008,325

(22) Filed: Jan. 10, 2008

(65) Prior Publication Data

US 2008/0179300 A1    Jul. 31, 2008

Related U.S. Application Data

(62) Division of application No. 11/234,046, filed on Sep. 23, 2005, now Pat. No. 7,458,765.

(51) Int. Cl.
*B23K 26/14* (2006.01)
*B23K 26/34* (2006.01)

(52) U.S. Cl. .............. 219/121.84; 118/641; 219/121.63; 219/121.78

(58) Field of Classification Search ............. 219/121.63, 219/121.78, 121.84, 121.47, 121.65; 427/596, 427/597; 118/641
See application file for complete search history.

(56) References Cited

U.S. PATENT DOCUMENTS

| | | | |
|---|---|---|---|
| 4,002,466 A * | 1/1977 | MacRae et al. ............... | 75/10.22 |
| 4,116,688 A | 9/1978 | Kaarlela | |
| 4,547,221 A | 10/1985 | Norman | |
| 4,724,299 A | 2/1988 | Hammeke | |
| 4,916,273 A * | 4/1990 | Browning ................. | 219/121.47 |
| 5,017,754 A * | 5/1991 | Drouet et al. ............ | 219/121.48 |
| 5,021,629 A * | 6/1991 | Shimomura ............ | 219/121.47 |
| 5,043,548 A * | 8/1991 | Whitney et al. .......... | 219/121.47 |
| RE33,767 E | 12/1991 | Christini et al. | |
| 5,127,800 A | 7/1992 | Hyll et al. | |
| 5,245,155 A * | 9/1993 | Pratt et al. ................ | 219/121.63 |
| 5,372,861 A | 12/1994 | Kerrand et al. | |
| 5,413,641 A * | 5/1995 | Coulon ......................... | 148/224 |
| 5,441,817 A | 8/1995 | Rai | |
| 5,486,676 A * | 1/1996 | Aleshin ..................... | 219/121.63 |
| 5,556,560 A * | 9/1996 | Ahola et al. ............. | 219/121.47 |
| 5,688,564 A * | 11/1997 | Coddet et al. ................. | 427/596 |
| 5,755,298 A | 5/1998 | Langford et al. | |
| 5,961,862 A * | 10/1999 | Lewis et al. .............. | 219/121.63 |

(Continued)

FOREIGN PATENT DOCUMENTS

DE    19635633 A1    3/1998

(Continued)

OTHER PUBLICATIONS

Machine translation of Japan Patent document No. 11-267,866-A, Sep. 2009.*

(Continued)

*Primary Examiner* — Geoffrey S Evans
(74) *Attorney, Agent, or Firm* — Ian C. McLeod

(57) ABSTRACT

The present invention relates to hard coating of ferrous metal substrates using a laser beam with diamond particles in a metal matrix produced from precursor powders of metals which bond to the diamond particles and to the ferrous substrate. The hard coating is particularly useful for white iron castings for pumps (200) used in piping tar sand and water mixtures.

7 Claims, 13 Drawing Sheets

U.S. PATENT DOCUMENTS

| | | | |
|---|---|---|---|
| 6,146,476 | A | 11/2000 | Boyer |
| 6,176,888 | B1 | 1/2001 | Ritt et al. |
| 6,197,386 | B1 | 3/2001 | Beyer et al. |
| 6,238,280 | B1 | 5/2001 | Ritt et al. |
| 6,316,065 | B1 * | 11/2001 | Wallmann ............... 427/596 |
| 6,316,744 | B1 * | 11/2001 | Nowotny et al. ......... 219/121.84 |
| 6,396,025 | B1 * | 5/2002 | Pyritz et al. ............. 219/121.84 |
| 6,485,532 | B2 | 11/2002 | Andrews et al. |
| 6,495,793 | B2 * | 12/2002 | Tewari .................... 427/596 |
| 6,770,107 | B2 | 8/2004 | Teutsch et al. |
| 6,843,866 | B2 | 1/2005 | Brenner et al. |
| 7,259,353 | B2 * | 8/2007 | Guo ........................ 219/121.84 |
| 2003/0226832 | A1 * | 12/2003 | Liu et al. ................. 219/121.69 |
| 2004/0011284 | A1 * | 1/2004 | Schucker ................. 118/688 |
| 2004/0155096 | A1 | 8/2004 | Zimmerman et al. |
| 2005/0056628 | A1 * | 3/2005 | Hu ........................... 219/121.84 |
| 2006/0165973 | A1 | 7/2006 | Dumm et al. |
| 2006/0169679 | A1 * | 8/2006 | Sato et al. ................ 219/121.64 |
| 2006/0266740 | A1 * | 11/2006 | Sato et al. ................ 219/121.84 |

FOREIGN PATENT DOCUMENTS

| | | |
|---|---|---|
| DE | 19744214 A1 | 4/1999 |
| DE | 19844397 A1 | 3/2000 |
| DE | 19903436 C2 | 8/2000 |
| DE | 10024155 A1 * | 4/2001 |
| DE | 10034763 A1 | 2/2002 |
| DE | 10158933 A1 | 6/2003 |
| DE | 10160785 C1 * | 8/2003 |
| DE | 10227460 A1 | 1/2004 |
| EP | 1155768 B1 | 4/2001 |
| EP | 1301647 B1 | 7/2001 |
| JP | 7-51781 A * | 2/1995 |
| JP | 7-51871 A * | 2/1995 |
| JP | 11-267866 A * | 10/1999 |
| JP | 11-302819 A * | 11/1999 |
| JP | 302819 A | 11/1999 |
| JP | 2002-79390 A * | 3/2002 |
| JP | 2005-219060 A * | 8/2005 |
| WO | WO9815672 A1 | 4/1998 |
| WO | WO-2005-000517 A1 * | 1/2005 |

OTHER PUBLICATIONS

Machine translation of Japan Patent document No. 2002-79,390-A, Sep. 2009.*

Machine translation of Japan Patent No. 11-302,819, Mar. 2010.*

J. Arnold et al., "Laser Powder Technology for Cladding and Welding", Jun. 1999, Journal of Thermal Spray Technology, vol. 8(2), pp. 243-248.*

Kirk Othmer, vol. 23 133-134 (1983; Third Edition).

Lin, J. "Concentration Mode of the Powder Stream in Coaxial Laser Cladding," Optics & Laser Technology 31 (1999) 251-257.

International Preliminary Report on Patentability for PCT/US2006/036439, dated Jul. 16, 2008.

* cited by examiner

LASER APPARATUS FOR HARD SURFACE COATINGS

CROSS-REFERENCE TO RELATED APPLICATIONS

This application is a division of U.S. application Ser. No. 11/234,046 (now U.S. Pat. No. 7,458,765) filed on Sep. 23, 2005.

STATEMENT REGARDING FEDERALLY SPONSORED RESEARCH OR DEVELOPMENT

Not Applicable

STATEMENT REGARDING GOVERNMENT RIGHTS

Not Applicable

BACKGROUND OF THE INVENTION (1) Field of the Invention

The present invention relates to a process for laser beam hard coating of a ferrous metal substrate with diamond particles in a metal matrix. In particular, the present invention relates to hard coating a cast iron article, particularly a white iron casting, in order to improve the abrasion resistance of the coated surfaces of the article. More particularly the present invention relates to pumps having hard coated surfaces of the pump which are in contact with an abrasive water and tar sand mix.

(2) Description of the Related Art

The prior art has described processes for using nozzles providing a particle spray and a laser beam for applying a hard faced surface coating to a ferrous substrate. U.S. Pat. Nos. 4,724,299 to Hammeke and 6,316,744 to Nowotny et al are illustrative of the patent art. The disclosures of these patents are incorporated by reference herein in their entireties. In general, a powdered mixture of a metal alloy with particles of a hard material are coated on a substrate by melting the particles of the metal alloy on a spot surface of the substrate irradiated by the laser beam. Diamonds have been used in cutting tools as evidenced by U.S. Pat. Nos. 6,176,888 and 6,238,280 by unrelated processes.

Diamond particles have been incorporated into a metal alloy in the past in an attempt at providing a hard coating in parts which are continuously abraded by hard particles. The problem is that there is a poor bond between the diamond and the metal alloy when abraded by sand particles in an aqueous slurry. The result is that when abraded the diamond particles come loose from the coated surface. There is a need for an improved hard coating process and the resulting products. Relevant prior art is DE10024155 (which corresponds to EP1155768).

OBJECTS

It is therefore an object of the present invention to provide a laser cladding or hard coating process which enables bonding of the surface of the diamond particles to the metal alloy and bonding of the ferrous surface to the metal alloy in such a way that the hard coating is resistant to abrasion, particularly by sand particles. It is also an object of the present invention to provide a process which is economical and reliable and capable of being automated with robotics and CNC controlled machines or devices. These and other objects will become increasingly apparent by reference to the following description.

SUMMARY OF THE INVENTION

The present invention relates to an article of manufacture which is a ferrous substrate comprising carbon which requires a hard faced surface coating to reduce wear in use; and a layer of a composite which provides the hard faced surface coating comprising diamond particles in a metal matrix which is bonded on the diamond particles, and wherein the layer is bonded to the substrate. Preferably the diamond particles are between about 40 and 100 microns in their largest dimension. Preferably the matrix comprises copper, tin and titanium. Preferably the matrix consists essentially of about 60 to 80% by weight copper, 15 to 25% by weight tin and 5 to 20% by weight titanium. Preferably there is a plurality of overlapping layers on the substrate wherein each layer is 40 to 80% of a single track width. Preferably the substrate is a casting of white iron or a steel comprising about 4% by weight or less of the carbon. The diamond particles can be naturally or synthetically derived.

The present invention also relates to a process for providing an article of manufacture with a hard faced surface coating which comprises: providing a ferrous substrate containing carbon and requiring a hard faced surface coating; feeding a particulate mixture of diamond particles and separating metal particles which can be melted to provide a matrix around the diamond particles into a heating zone while impacting the mixture with a laser beam in a non-reactive atmosphere so as to form the hard faced surface coating as a layer bonded to substrate and the diamond particles. Preferably the process is conducted at a temperature between 400 and 900° C. Decomposition of the diamond particles at high temperature is avoided due to the low heat input of the laser process and the rapid cooling of the clad layer. Preferably the metal particles comprise copper, tin and titanium. Preferably the diamond particles comprise 30 to 50% by volume of the metal particles. Multiple of the layers can be formed on the substrate, although this is not preferred. Preferably the substrate is a white iron or a steel comprising 4% or less by weight of the carbon. Preferably the atmosphere is argon. Preferably particles are applied through moving a head or article which is robotically driven or a CNC controlled system, which head supplies the particles and the laser beam on the substrate in a continuous stream so that the layer is applied as adjacent overlapping lines on the substrate.

The present invention also relates to an apparatus for hard faced surface coating a ferrous metal substrate containing carbon which comprises: a first support means for holding the substrate; a supply means mounted on a second support means adjacent the first support means for supplying diamond particles with particles of a metal matrix onto the substrate in a heating zone which is heated by a laser beam to provide the heat, wherein the first and the second support means are adjacent to each other and moveable relative to each other and wherein in use the laser beam bonds the diamond particles onto the substrate at a temperature controlled so as to not degrade the diamond particles to provide the hard faced surface coating in the metal matrix as the hard faced surface coating. Preferably the first support means is moveable and mounts a head for supplying the laser beam and the particles and the second support means is fixed. Also the article can be moved relative to the laser beam.

The present invention also relates to an improvement in a pump comprising a rotatable fluid impeller and a housing supporting an impeller for rotation in the housing for the pumping, which comprises at least one surface inside of the pump with a hard faced surface coating which engages the fluid to be pumped, wherein the surface which is coated comprises a ferrous composition comprising carbon and wherein coating comprises a layer of a composition comprising diamond particles in a metal matrix which is bonded to the diamond particles, and wherein the layer is bonded to the substrate. Preferably a face of an inlet plate which diverts flow of the fluid to the impeller has the hard faced surface coating. Preferably the pump comprises a white cast iron. Preferably the housing, the impeller and a diverter plate in the inlet of the pump comprise the hard faced coating. The pump parts which are worn in use by abrasion can be hard coated and reused. The coating is also resistant to impact by particles in the fluid.

The present invention further relates to an improvement in a method of pumping a fluid containing abrasive particles, which comprises: providing a pump comprising a rotatable fluid impeller and a housing supporting the impeller for the rotation in the housing for pumping, wherein at least one surface in the pump which engages the fluid to be pumped has a hard faced surface coating, wherein the surface which is coated comprises a ferrous composition comprising carbon and wherein the coating comprises at least one layer of a composition comprising diamond particles and a metal matrix bonded to the diamond particles, and wherein the layer is bonded to the substrate; pumping the fluid in the pump, wherein the layer of the coating inhibits erosion by the abrasive particles. Most preferably the abrasive particles are in a tar sand which is transported in an aqueous solution from a mining site. Most preferably the pump comprises cast white iron on the surfaces in contact with the fluid and abrasive particles. Preferably portions of the housing, the impeller and a suction liner for an inlet of the pump comprise the hard face coating.

The present invention also relates to an improvement in a pumping system comprising a rotatable fluid impeller and a housing supporting the impeller for the rotation in the housing for pumping and piping, which comprises at least one surface inside of the pump and optionally portions of the piping in the system with a hard faced surface coating which engages the fluid to be pumped, wherein the surface which is coated comprises a ferrous composition comprising carbon and wherein coating comprises a layer of a composition comprising diamond particles in a metal matrix which is bonded to the diamond particle, and wherein the layer is bonded to the substrate. Preferably a face of an inlet plate which diverts flow of the fluid to the impeller has the hard faced surface coating.

The present invention also relates to an improvement in a method of pumping a fluid in a pumping system containing abrasive particles, which comprises: providing a pump in the pumping system with piping comprising a rotatable fluid impeller and a housing supporting an impeller for and optionally portions of piping in the system the rotation, wherein at least one surface in the pump and optionally portions of piping in the system which engages the fluid to be pumped has a hard faced surface coating, wherein the surface which is coated comprises a ferrous composition comprising carbon and wherein the coating comprises at least one layer of a composition comprising diamond particles and a metal matrix bonded to the diamond particles, and wherein the layer is bonded to the substrate; pumping the fluid in the pumping system, wherein the layer of the coating inhibits erosion by the abrasive particles. In the preferred use of the system the abrasive particles are in a tar sand which is transported in an aqueous solution from a mining site. FIGS. 3, 4, 5 and 6 show the preferred pump and parts which are hard coated by the present invention. The dotted areas are the hard coatings. The process is effective at higher temperatures (more than 600° C.) because of the big heat sink of the ferrous metal parts and the comparable low heat input by the laser. Thus there is a rapid cooling for laser beam cladding.

DESCRIPTION OF PREFERRED EMBODIMENTS

Apparatus

Figure 1:
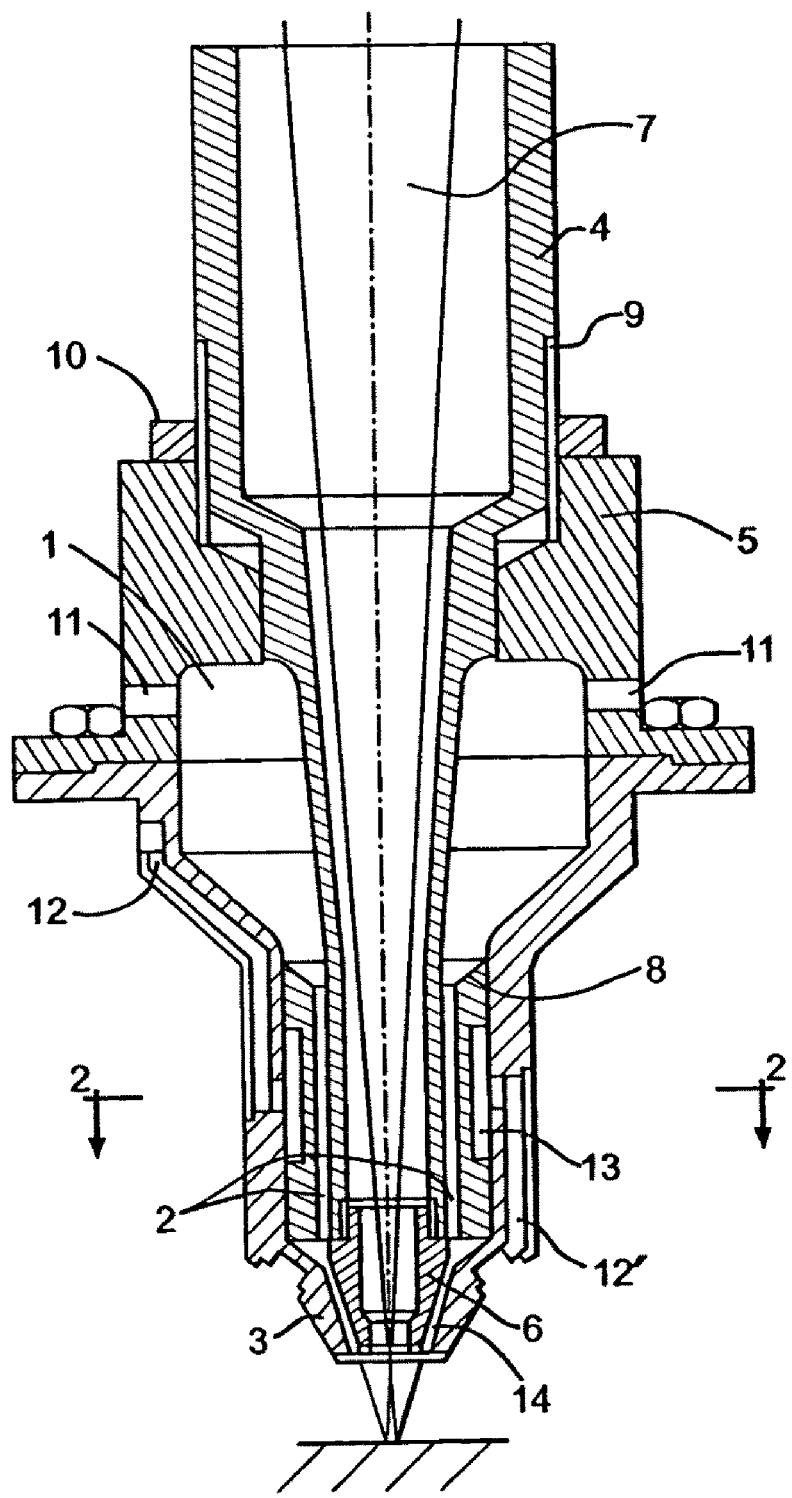
FIG. 1 shows a longitudinal cross-sectional view of a preferred head or nozzle for delivering particles of the alloy and diamonds as well as a laser beam onto a ferrous substrate to produce a hard coating on the substrate.
Figure 2:
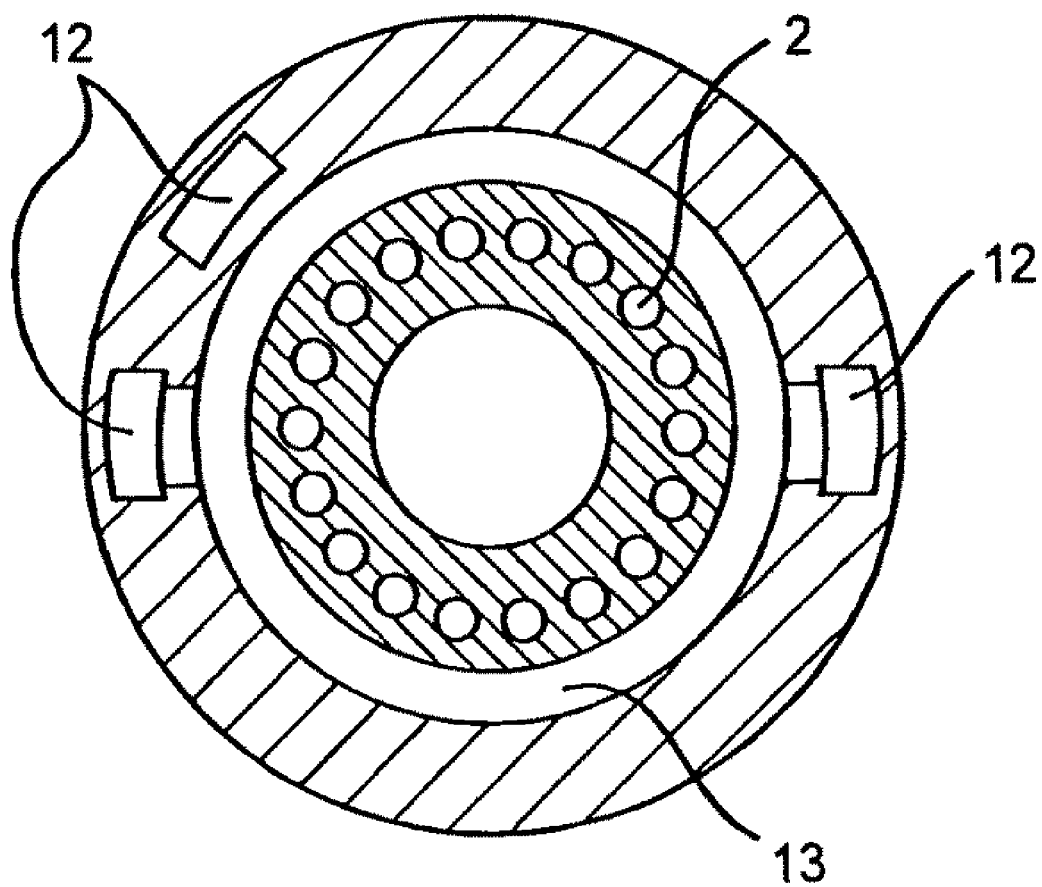
FIG. 2 is a cross-sectional view along line 2-2 of FIG. 1.

A preferred coating head is shown in FIGS. 1 and 2 of U.S. Pat. No. 6,316,744. The apparatus is adapted to process diamond and matrix metal alloy particles. A housing which is formed from two parts 4, 5 is used, which parts are connected to one another by means of a screw thread 9, with the possibility of fixing the parts in a specific position by means of an additional locking nut 10. The screw thread 9 can be used to displace the two parts 4 and 5 of the housing relative to one another, resulting in telescopic displacement parallel to the longitudinal axis of a laser beam 7.

Using a beam-guiding means and, if appropriate, also a beam-shaping unit (not shown here), the laser beam 7 can be directed through the housing part 4 onto the surface of a diagrammatically depicted workpiece. The focusing of the laser beam 7 is set in such a way that a specific beam spot size can be obtained on the surface of the workpiece, approximately corresponding to the size of a focal point of a hollow powder jet. As can be seen from FIG. 1, the focus of the laser beam 7 may also be arranged inside the housing of the machining head.

An inert gas can be guided through the housing part 4 onto the surface of the workpiece in addition to the laser beam 7, which on the one hand allows improved cooling and on the other hand is able to prevent droplets which splash up from the surface from penetrating into the housing.

Both the part 4 and the part 5 of the housing are in this example designed with rotational symmetry about the longitudinal axis of the laser beam 7. A turbulence chamber 1, which surrounds the part 4 of the housing and into which radially opposite entry openings 11 lead in the upper area of the turbulence chamber 1, is formed between part 4 and part 5 of the housing. A powder-gas flow can be guided into the turbulence chamber 1 through each of the entry openings 11, and the powder components, which may be different, can be mixed inside the turbulence chamber 1. The bottom part of the turbulence chamber 1 is of conically tapering design, and an angle of inclination of the cone which prevents powder particles from sticking to the inner wall should be selected.

In this embodiment, the turbulence chamber 1 leads into an inlet funnel 8, in which, in turn, there are entry openings for stabilizing passages 2. As can be seen from FIG. 1, the stabilizing passages 2 are aligned parallel to the longitudinal axis of the laser beam 7, and as can be seen in particular in FIG. 2, they are arranged radially symmetrically over the circumference, with a constant distance between them. The powder together with the carrier gas then passes through the cylindrical stabilizing passages 2 into an annular gap 14 which tapers conically into the direction of the surface of the workpiece. The cone angle of the annular gap 14 should be selected here in such a way that the coaxial hollow powder jet which emerges from the annular gap 14 strikes the surface of the workpiece with a small diameter, preferably at its focal point.

On the housing part 4, there is an exchangeable nozzle tip 6, which in this case is connected to the housing part 4 by means of a screw thread. At least part of the outer circumferential surface of the nozzle tip 6 forms in this case the inner wall of the annular gap 14.

On that side of the housing part 5 which faces the surface of the workpiece, a conical outer nozzle 3 is present or is formed. This outer nozzle 3 may also be an exchangeable design. The inner circumferential surface of the outer nozzle 3 then forms the outer wall of the annular gap 14. This design makes it possible to vary the clear width of the annular gap 14 by suitably rotating the two housing parts 4 and 5, resulting in a greater or lesser relative movement of the housing parts 4 and 5 with respect to the longitudinal axis of the laser beam 7 depending on the corresponding angle of rotation.

One or more cooling passages 12, 12' and 13, which are connected to one another and through which a cooling agent, preferably water, can pass in particular into the critical part of the machining head, are formed on the part 5 of the housing and, in addition, on the part 4. The annular cooling passage 13 can cool in particular the inner part 4 with nozzle tip 6. The cooling passage 12' acts in particular on the area of the outer nozzle 3. With this integrated cooling system, it is possible to readily deal with even the critical heating which is generated by prolonged use.

Process

A "matrix metal alloy" as used herein is one which is based upon a mixture of metals which metals melt at elevated temperatures, usually between about 400° to 900° C., without damaging the diamond particles, to produce the hard faced coating. Numerous metal alloys in this temperature range are available, such as shown in Table 1.

TABLE 1

| Soldering process | Liquidus temperature [° C.] | Materials |
| --- | --- | --- |
| Soft soldering | <450 | Zinc-, Lead- and Tin-solder as well as Tin-Lead-solder metals |
| Hard soldering | 450 . . . 900 | Silver-, Copper- and Aluminum-basis solders |
| High temperature soldering | >900 | Nickel-, Copper- and noble metal solders |

In the present invention the preferred metal alloy matrix is a mixture of copper (Cu) and tin (Sn).

The pumps which are hard coated are preferably made of white iron castings because of durability and abrasion resistance. The problem is that the white iron alone is not sufficiently wear resistant when tar sands are being pumped. The term "white iron" refers to a relatively brittle cast iron that is essentially free of graphite where most of the carbon is present as hard $F_3C$, referred to as cementite. White iron exhibits a white crystalline fractive surface because fracture occurs along the iron platelets. When heated over a long period of time, white iron becomes malleable iron where the $F_3C$ becomes iron with nodules of graphite. A typical composite of a high abrasive white iron is set forth in Table 2. Table 2 shows a typical composition of white iron which is a preferred substrate for hard coating.

TABLE 2

| Fe | C | Mn | Si | P | S | Cr | Ni | Cu | Mo | Al | Mg | CE |
| --- | --- | --- | --- | --- | --- | --- | --- | --- | --- | --- | --- | --- |
| 70.85 | 2.78 | 0.39 | 1.26 | 0.042 | 0.056 | 23.15 | 0.46 | 0.20 | 0.7781 | N/A | 0.259 | N/A |

Brinnel Hardness on 5 bars: 532, 532, 512, 555, 555

EXAMPLES

Figure 7:
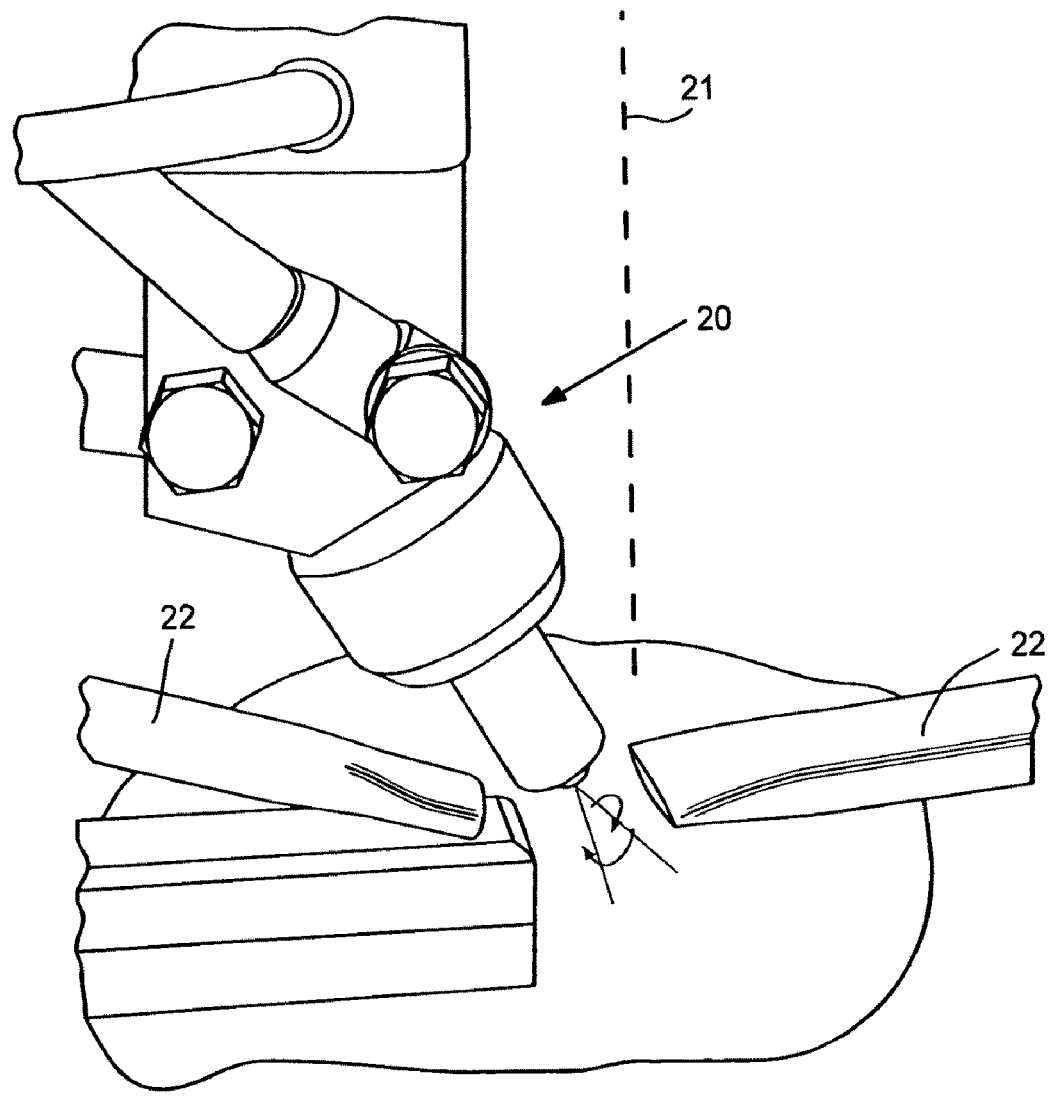
FIG. 7 is a perspective view showing a hard coating apparatus used in the Examples.
Figure 11A:
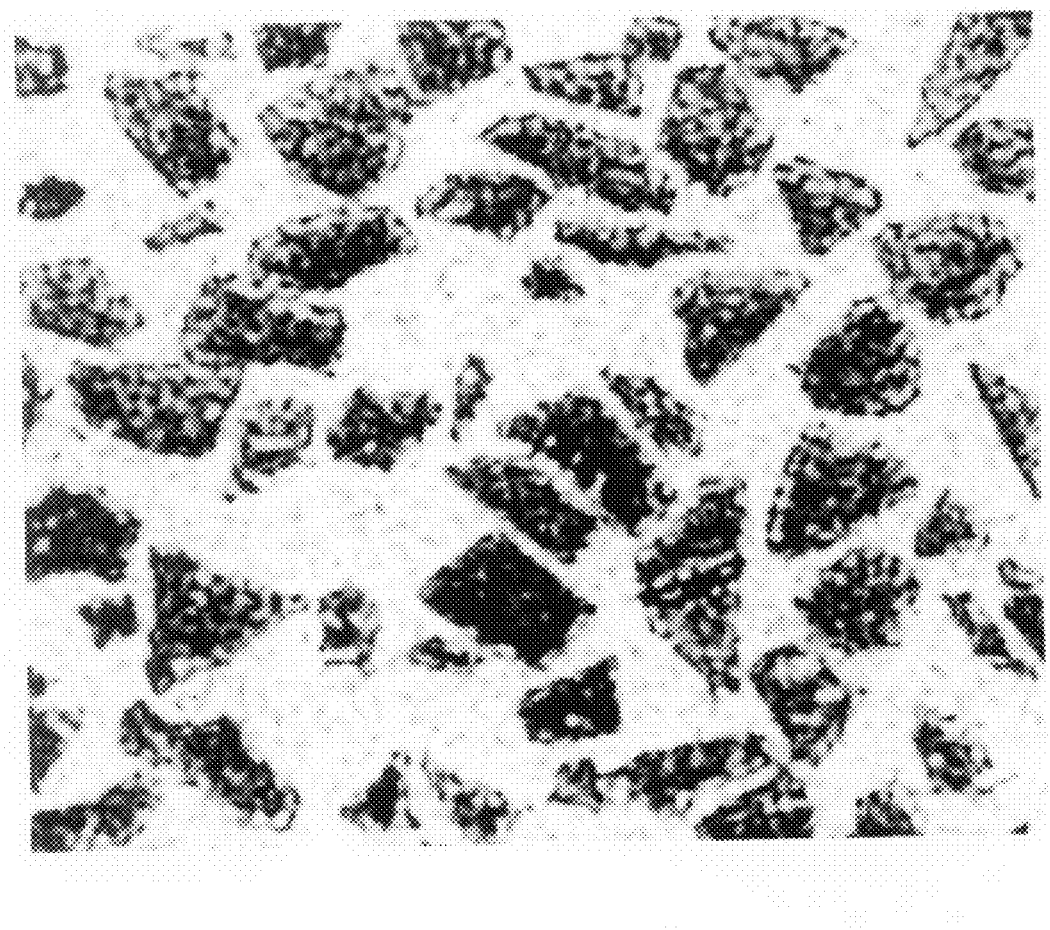
FIGS. 11A and 11B are microscopic cross sections of a diamond hard coating with matrix material CuSn20Ti13 The diamonds show as black. The particles were natural diamond with a mesh size of about 100.
Figure 11B:
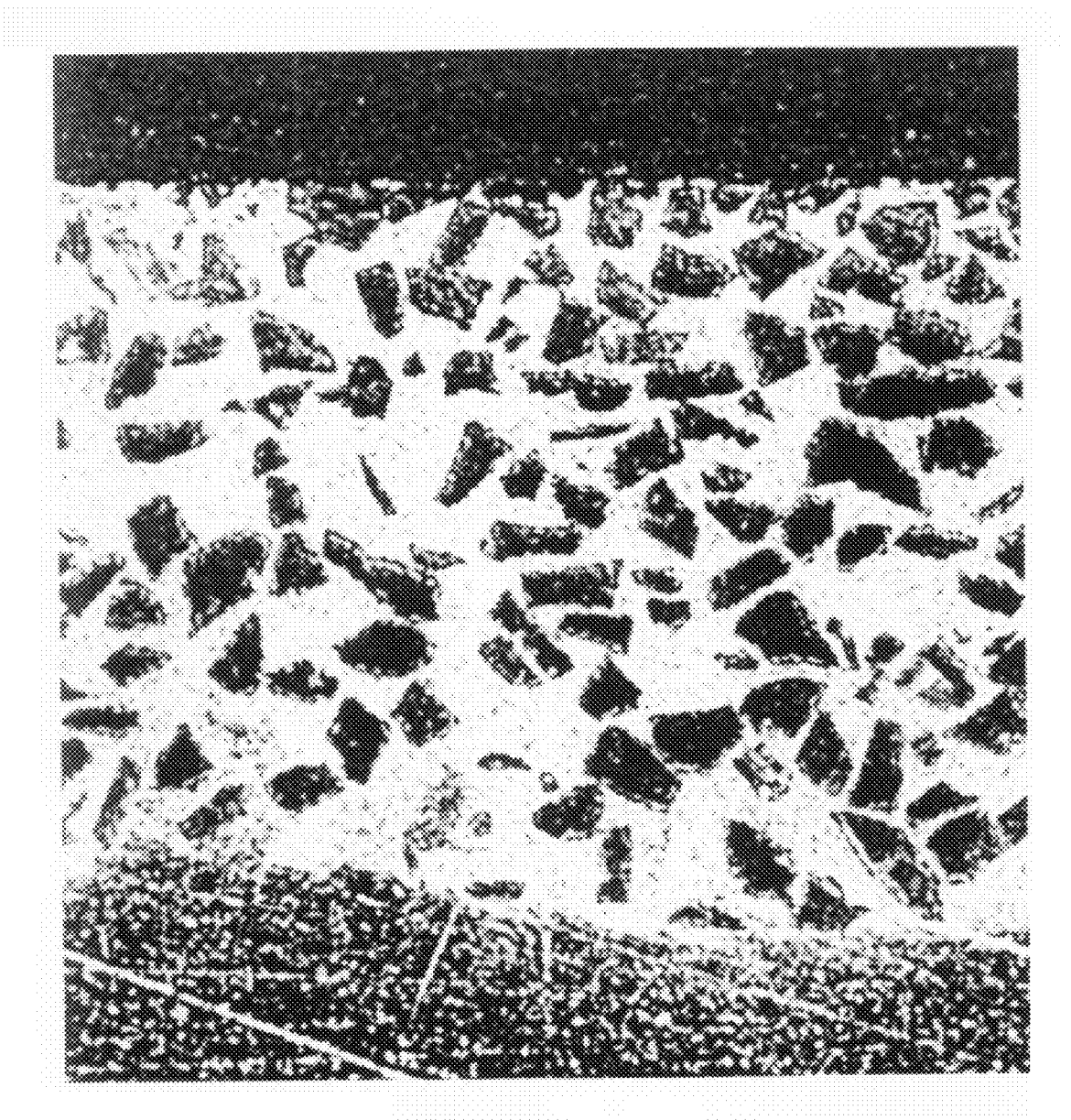

A sideways positioned cladding unit cyclone (Fraunhofer IWS, Dresden Germany) as shown in FIG. 7 was used in the Examples. The cyclone nozzle technical information is commercially available. The Technical Information is as follows: Application Cyclone to alloy of two powders Optimal grain size 40 to 200 μm—other sizes are possible Recommended powder feeding rates 2 to 10 g/min to 1 kW laser power; 40 g/min to 3 kW laser power. Minimum powder focus approximately 3 to 6 mm. Distance nozzle working surface—13 mm. Nozzle tip changeable—diameter 1 to 3 mm (1 steps to 0.5 mm) possible. Maximum laser power—5 kW (diode laser). Higher laser power may decrease the long-term stability. Compatible laser—$CO_2$-, Nd:YAG—, diode laser. Dimensions—height: 100.0 mm minimum height without nozzle top; diameter: 50.0 mm. Connection—2 connections for powder feeding, inclined; 1 connection for inert gas, inclined; 2 connections for cooling water (flow by room temperature);

All connections for flexible tube with 6 mm external diameter. Included in delivery—X—Y—Z positioning unit. 1 exchangeable nozzle tip couple. An added nozzle for a protection or non-reactive gas is used The following specific Examples demonstrate a good bonding of the hard coating material to the substrate which is white iron, a good content and distribution of the diamonds in the coating and thus increased wear resistance. FIGS. 11A and 11B show a cross-section of the diamonds in CuSn20Ti13 metal matrix where the numbers are percentages by weight. The diamonds are natural and are 100 mesh size. A main objective of the Examples was to establish different laser parameters, cladding strategies to achieve strong bonding without damaging the diamond particles and to increase the wear resistance. The samples of FIGS. 11A and 11B met the requirements of the G65 wear test (ASTM).

Tests were performed to provide laser clad natural diamond particles in the copper-tin titanium matrix as shown in FIGS. 11A and 11B. In these tests it was important to understand the performance of the coating and how it relates to the percentage of diamond content. The wear performance and bonding of the diamonds in the matrix is dependent on the fraction of diamonds in the coating, so this was evaluated on the white iron.

As shown in FIG. 7, the process was carried out with a 4.4 kW diode pumped Nd:YAG Rofin-Sinar (Hamburg, Germany) and the beam 21 was supplied to the work piece via a 400 micron fiber and a 200 mm collimator with 200 mm focus lens (not shown). The laser beam 21 had a vertical position. A powder nozzle 20 supplied the coating powder with Argon as conveying and shield gas. The powder nozzle was located off axis and in front of the position of the laser beam 21. The direction of coating is left to right. The hard coating material was a mixture of the matrix material particles and the diamond particles. Argon gas was supplied by one or both gas supply nozzles 22.

First, the heat input that was required to fully fuse the matrix to the diamond particles and to the substrate was determined. During the tests, the relative positioning of the coupons (substrate) and the laser beam focus was optimized.

Figure 9:
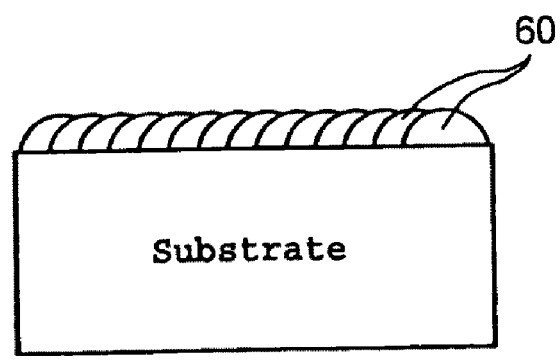
FIG. 9 is a side view of overlapping layers 60 of the hard faced coating produced in the Examples.

FIG. 9 shows the resulting cladding or hard coating on coupons (substrate). The cladding direction was on the long and on the short axis. The desired coating layer has a height of at least 0.5 mm.

Results

The following Table 3 shows the cladding parameters and for coupons 1 to 4. The matrix material was preferably pre-screened (100 mesh) to improve the powder flow through the nozzle 21. So called "pulsing" occurs when the powder is blown into the melt pool. Pulsing causes unstable flow conditions and thus inhomogeneous cladding results. The layer height is particularly affected. This problem could be reduced by using this screening.

Another problem is the shield gas (argon) supply. For this tests 2 additional gas supply nozzles 22, one in front and one behind the laser beam were used. The shield gas supply was through the powder nozzle 20 as well as the carrier gas for the diamond particles. Thus oxidation of the coating was mainly avoided. However, the front (left) nozzle has some influence on the powder flow in the melt pool and makes the process unstable. Therefore this nozzle was removed in later tests which solved this problem.

The layer height of each coupon was measured before and after cladding. From Table 1 it was learned that the height depends on the powder mass flow which is set by the rotation speed for the diamonds and the alloy powder inside of the powder nozzle 20.

TABLE 3

Laser: Nd:YAG (400 μm fiber, Focus distance 205 mm, Spot size 3~4 mm
Alloy: CuSn20Ti13 premixed, 100-325 mesh size screened
Diamond: natural diamonds mesh size 100
Double sided shield gas
Substrate: White iron, thickness 11.40 mm

|  | Thickness [mm] | Rotation Diamond [rpm] | Rotation Alloy [rpm] | Power [W] | F [mm/min] | Hatch distance [mm] |
|---|---|---|---|---|---|---|
| Coupon 1 | After layer 1: 12.6 | 1 | 2.5 | 1800 | 370 | 2 |
|  | After layer 2: 13.4 | 1 | 2.5 | 1800 | 370 | 2 |
| Coupon 2 | After layer 1: 13.0 | 1.5 | 2.5 | 1700 | 370 | 2 |
|  | After layer 2: 14.0 | 1.5 | 2.5 | 1700 | 370 | 2 |
| Coupon 3 | After layer 1: 12.8 | 1 | 2.5 | 1800 | 370 | 2 |
|  | After layer 2: 13.5 | 1 | 2.5 | 1800 | 370 | 2 |
| Coupon 4 | After layer 1: 12.8 | 1.5 | 2.5 | 1700 | 370 | 2 |
|  | After layer 2: 14.3 | 1.5 | 2.5 | 1700 | 370 | 2 |

The results of a wear test with ASTM procedure "A" are shown in Table 4 (for coupon #3 which was the best).

TABLE 4

DRY SAND/RUBBER WHEEL WEAR TEST
ASTM G 65 PROCEDURE "A"

Periodic Re-qualification of Apparatus
NBS Standard Reference Material 1857 Abrasive Wear Standard D-2

| Tool Steel SN: | 430B |
|---|---|
| Requirement: | 0.324 g ± 0.030 g loss |
| Actual: | 0.310 g |

TABLE 4-continued

DRY SAND/RUBBER WHEEL WEAR TEST
ASTM G 65 PROCEDURE "A"

TEST DATA

| Location | Conditioned Surface |
|---|---|
| Initial Mass (g) | 171.339 |
| Final Mass (g) | 171.220 |
| Mass Loss (g) | 0.119 |

G65 results coupon #3

Figure 12:
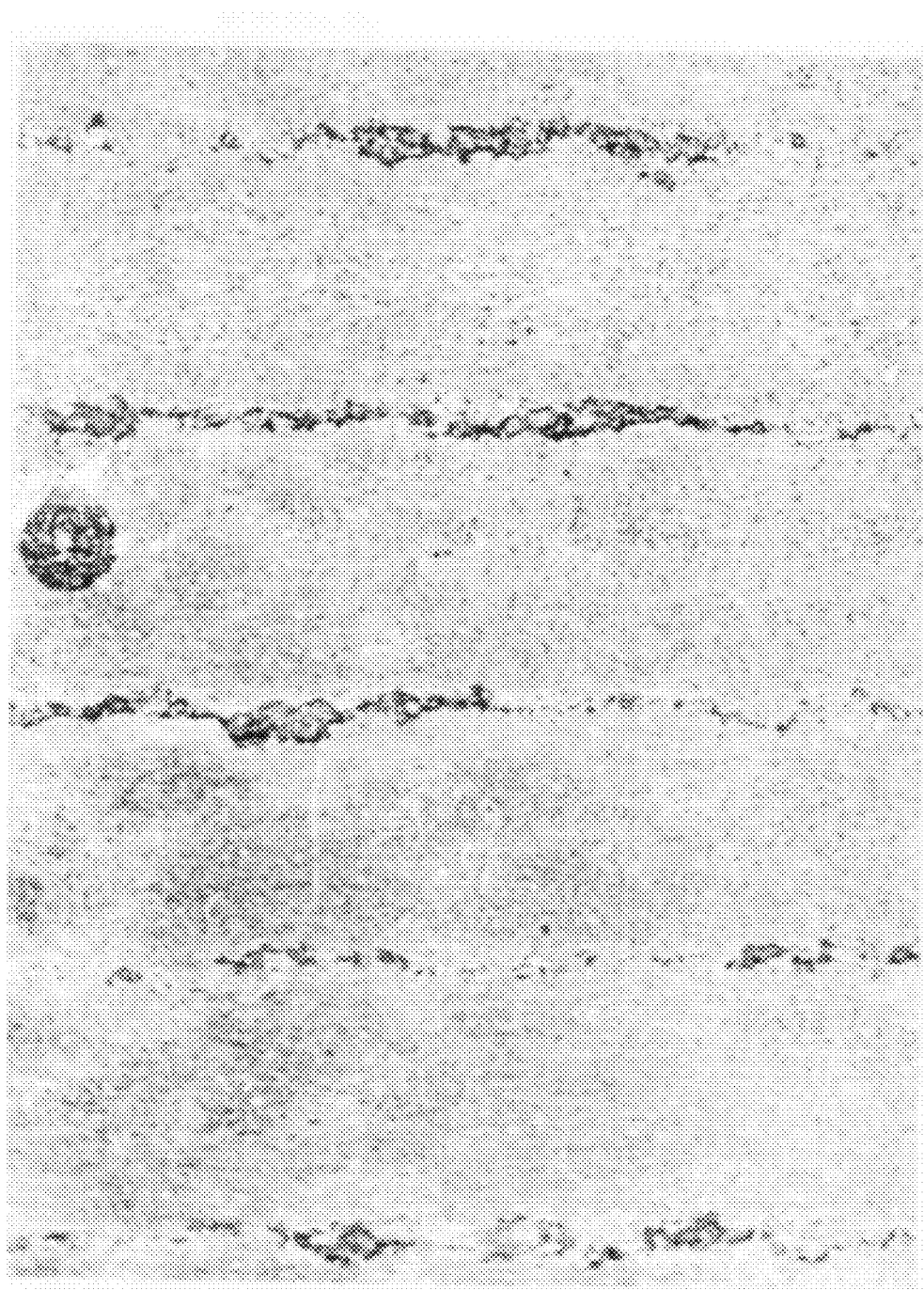
FIG. 12 is a microscopic plan view of a coating with spaces between the layers of the hard coating as an imperfection corrected by overlapping the layers as in FIG. 9.

The hatch distance has important influence on the G65 results. FIG. 12 shows a ground coupon (from ASTM 65) that was made with a hatch distance of 2 mm (same as in Table 2). The result of the G65 abrasive wear test for coupon 3 is shown in Table 3. The total mass loss was far too high, since the goal is 0.05 g or less. One reason was the hatch distance. The material was washed out in between the single tracks. The phenomena is clearly visible in FIG. 12. The overlap is not enough. Therefore this parameter was changed to 1 mm and is shown in FIG. 9.

Another problem that occurred was delamination of the first layer to the substrate and of the second layer to first layer where samples were double layer cladded. The reason was found to be in the diamond content in the layer. More delamination occurs with a higher diamond content. These observation were applied for cracking as well.

Tables 5 and 6 show the results with Coupons #5 to #9 using the single gas nozzle 22. The mass loss was 0.033 for Coupon #6 which was much better than the goal of 0.05.

TABLE 5

Diamond Cladding,
February 2005

| Laser: | Nd:YAG (400 μm fiber, Focus distance 205 mm, Spot size 3~4 mm) |
|---|---|
| Alloy: | CuSn20Ti13 premixed, 100-325 mesh size screened |
| Diamond: | natural diamonds |
| Z focus = 205 mm | One side shield gas |

Substrate: White iron, thickness 11.40 mm

| | Thickness [mm] | Rotation Diamond [rpm] | Rotation Alloy [rpm] | Power [W] | F [mm/min] | Hatch distance [mm] | |
|---|---|---|---|---|---|---|---|
| Coupon 5 | After layer 1: 12.9 | 2 | 3 | 2.3 | 700 | 1 | Short axis |
| Coupon 6 | After layer 1: 13.0 | 3 | 3 | 2.3 | 700 | 1 | Short axis |
| Coupon 7 | After layer 1: 13.2 | 4 | 3 | 2.2 | 700 | 1 | Short axis |
| Coupon 8 | Thick uneven | 3 | 3 | 2.2 | 650 | 1 | 50% 100 m |
| Coupon 9 | Thick uneven | 3 | 4 | 2.2 | 650 | 1 | 50% 100 m |

Powder feed rates

| Diamond | | Alloy | |
|---|---|---|---|
| Rpm | g/min | Rpm | g/min |
| 1 | 1.1 | 1 | 2 |
| 2 | 2 | 2 | 3.8 |
| 3 | 2.8 | 3 | 5.4 |
| | | 4 | 7.4 |

The samples were also wear tested as shown in Table 6 for Coupon #6

TABLE 6

DRY SAND/RUBBER WHEEL WEAR TEST ASTM g 65 PROCEDURE "A"

Periodic Re-qualification of Apparatus - Date Mar. 9, 2005
NBS Standard Reference Material 1857
Abrasive Wear Standard D-2 Tool Steel SN: 430B

| Requirement | 0.324 g ± 0.030 g loss |
|---|---|
| Actual | 0.304 g |

TEST DATA

| Location | Surface |
|---|---|
| Initial Mass (g) | 172.885 |
| Final Mass (g) | 172.852 |
| Mass Loss (g) | 0.033 |

G65 results coupon #6

Additional experiments were performed as follows:
Laser
Laser: Nd:YAG (400 μm fiber, working distance 221 mm).
Material
Alloy: CuSn20Ti13 premixed, 100-325 mesh size screened. Drying at 60 Celcius under Argon atmosphere. Diamond: natural diamonds, mesh 200-230 (MANT).

Powder hopper disk rotation speed versus measured powder mass flow for two materials

| Diamond | | Alloy | |
|---|---|---|---|
| Rotation Diamond [rpm] | Powder mass flow diamond | Rotation Alloy [rpm] | Powder mass flow Alloy |
| 1 | 1.4 | 1 | 2.2 |
| 2 | 2.2 | 2 | 3.8 |
| 3 | 3.4 | 3 | 5.8 |

Nozzle
Nozzle orifice 1.7 mm (measured)
Nozzle distance to spot center about 15 mm (measured with nozzle master)
Position Unit
X=+6
Y=middle
Z=24.5
Gas Parameter:
Ar+ pressure bottle 20 psi
Flow meter shield gas nozzle: 4 (full open)
Flow meter shield gas nozzle behind 20 (nozzle 5 mm above surface)
Table 7 shows the results of further refinement of the process for Coupons 10 to 23.

TABLE 7

Cladding white iron coupons
Substrate: White iron, thickness 11.40 mm

| | Thickness [mm] | Rotation Diamond [rpm] | Rotation Alloy [rpm] | Power [W] | F [mm/min] | Hatch distance [mm] | | G65 |
|---|---|---|---|---|---|---|---|---|
| Coupon 10 | 1-1.2 | 2 | 3 | 1500 | 700 | 1.7 | Short axis | |
| Coupon 11 | 1-1.2 | 2 | 3 | 1500 | 700 | 1.7 | Short axis | |
| Coupon 12 | 1-1.2 | 2 | 3 | 1500 | 700 | 1.7 | Short axis | 0.032 |
| Coupon 13 | 1-1.2 | 2 | 3 | 1500 | 700 | 1.7 | Short axis | |
| Coupon 14 | 1.5 | 3 | 3 | 1500 | 700 | 1.7 | Short axis delamination | |
| Coupon 15 | 1.5 | 3 | 3 | 1600 | 700 | 1.7 | Short axis | 0.078 |
| Coupon 16 | 1.2 | 2.5 | 3 | 1700 | 700 | 1.6 | Short axis | 0.02 |
| Coupon 17 | 1.2 | 2.5 | 3 | 1700 | 700 | 1.6 | Short axis | |
| Coupon 18 | 1 | 2.5 | 2.5 | 1700 | 700 | 1.5 | Long axis | 0.051 |
| Coupon 19 | 1 | 2.5 | 2 | 1600 | 700 | 1.5 | Long axis | 0.03 |
| Coupon 20 | 1 | 3 | 2.5 | 1600 | 700 | 1.6 | Long axis | 0.056 |
| Coupon 21 | 1 | 3 | 2.5 | 1600 | 700 | 1.6 | Short axis | 0.053 |
| Coupon 22 | 1 | 3 | 2.5 | 1600 | 700 | 1.6 | Short axis | |
| Coupon 23 | 1 | 3 | 2.5 | 1600 | 700 | 1.6 | Short axis | |

Figure 13:
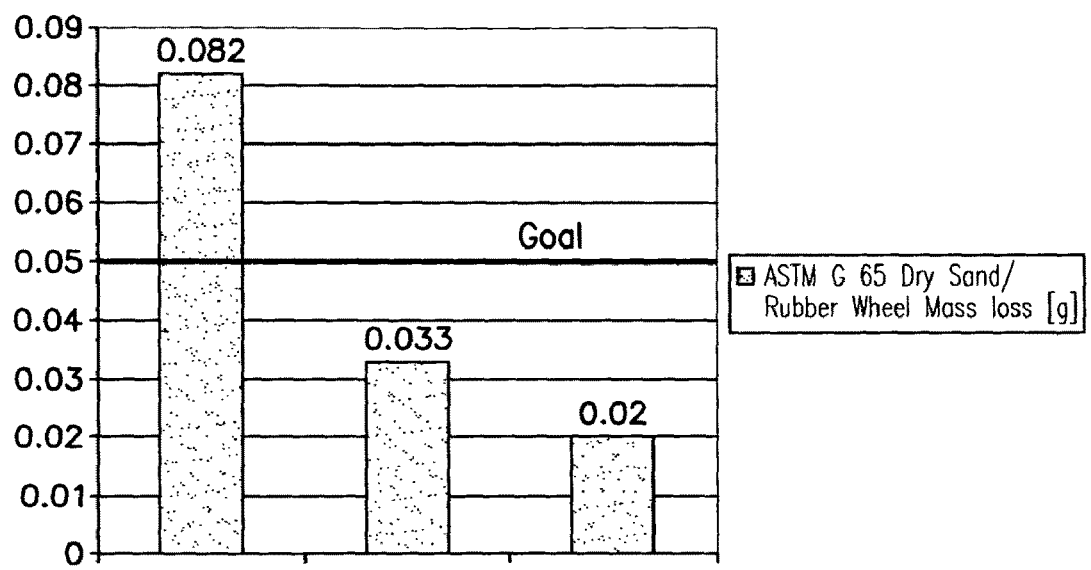
FIG. 13 is a graph showing a progression over a period of several months of improved mean abrasion test results on various samples over time leading to the 0.02 mass loss with ASTM 65 which uses dry sand and a rubber wheel.

The G65 results for Coupon 16 are more than double the goal of 0.05 mass loss. FIG. 13 shows the comparative G65 test results for various of the coupons. A comparison of the wear test results over several months is shown in FIG. 13. The coatings were improved in order to reach well beyond the goal of 0.05 g mass loss for use in the tar sand pump.

Pumps

Figure 4:
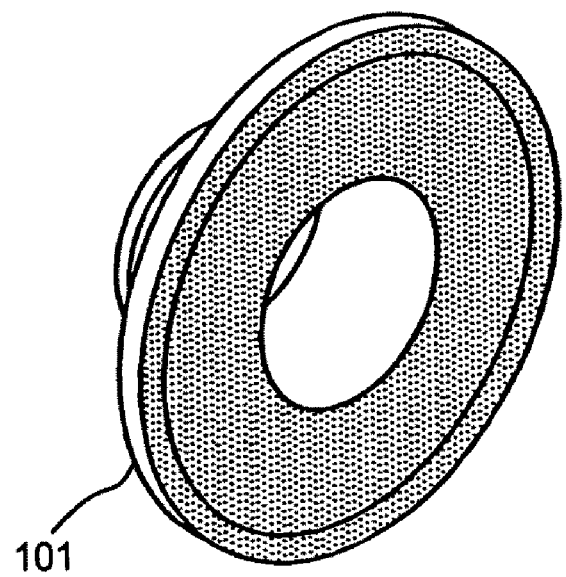
FIG. 4 is a perspective view of a hard coated suction liner 101 which optionally faces into an inlet of a pump.
Figure 6A:
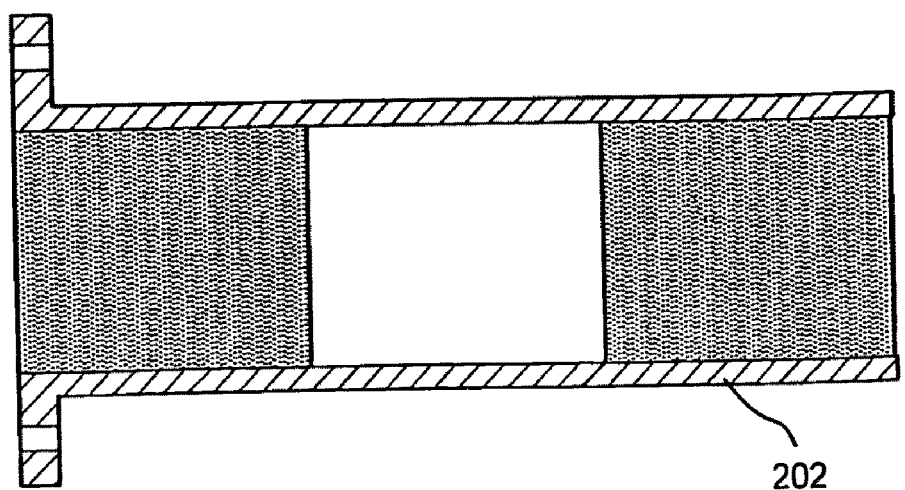
FIG. 6A shows piping to the pump with a diamond hard coating (dots).
Figure 6:
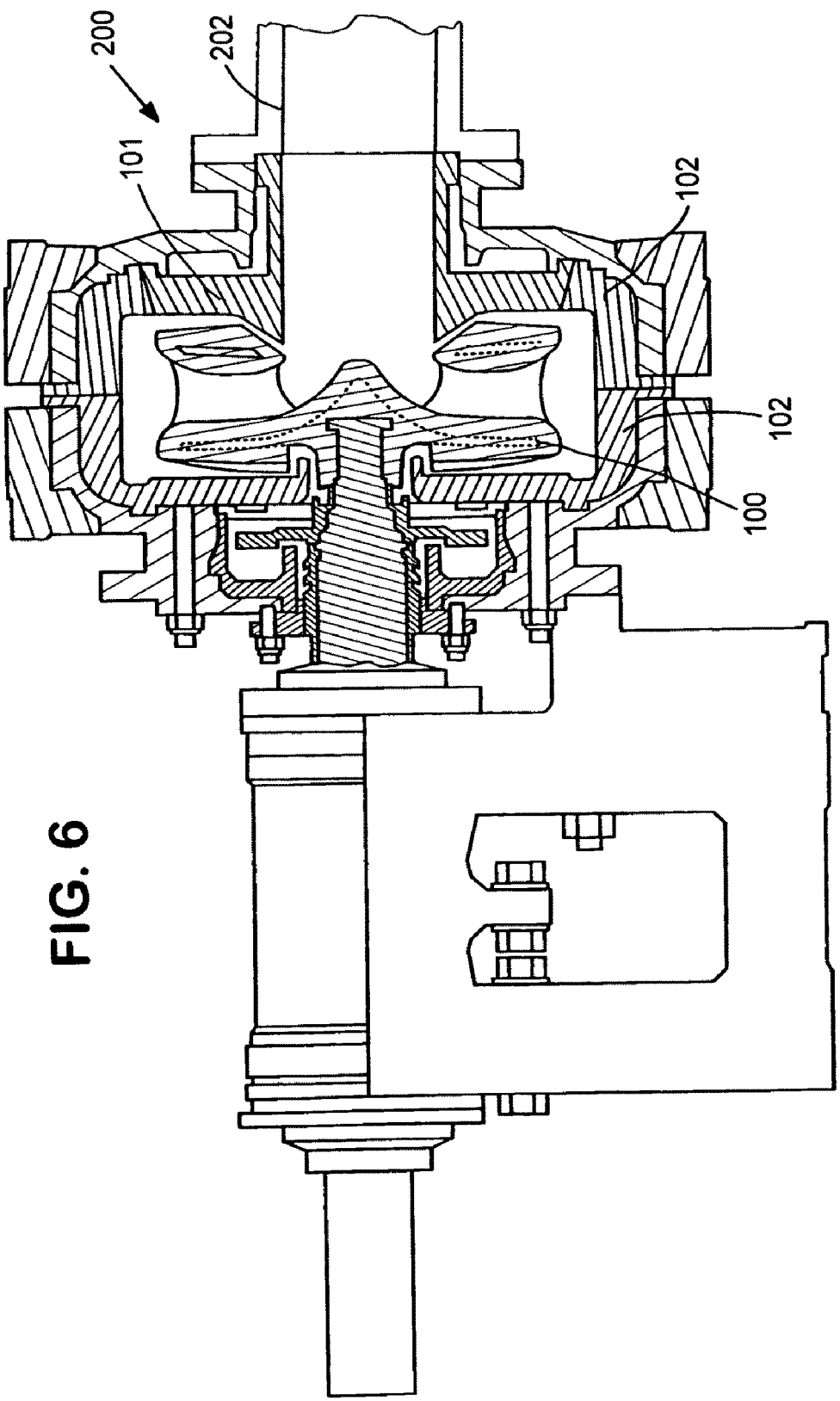
FIG. 6 is a cross-sectional view of an assembled pump showing the parts of FIGS. 3 to 5 in position in the pump.
Figure 6B:
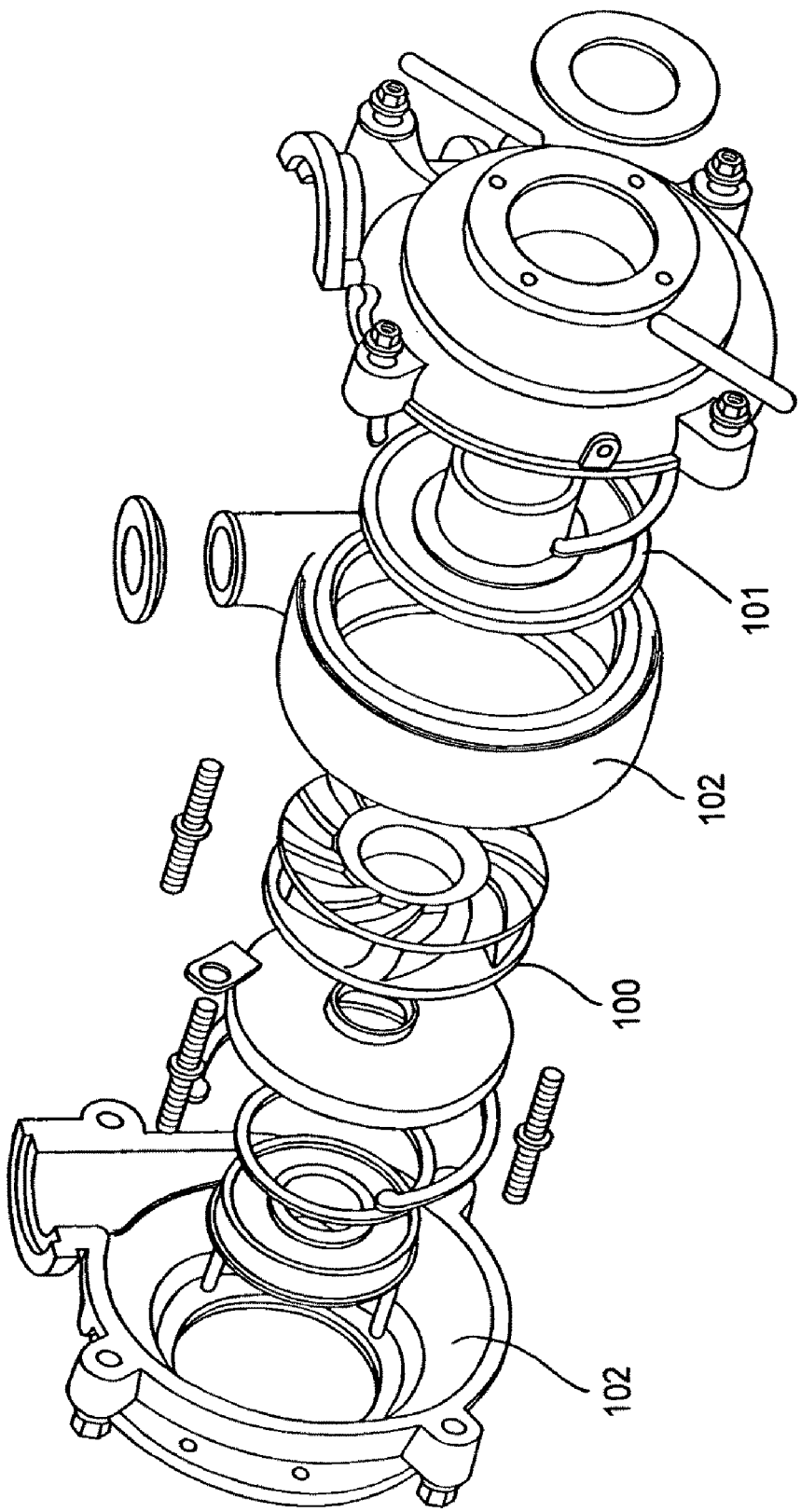
FIG. 6B is a perspective separated view of the pump 200 showing the position of the coated parts.
Figure 10:
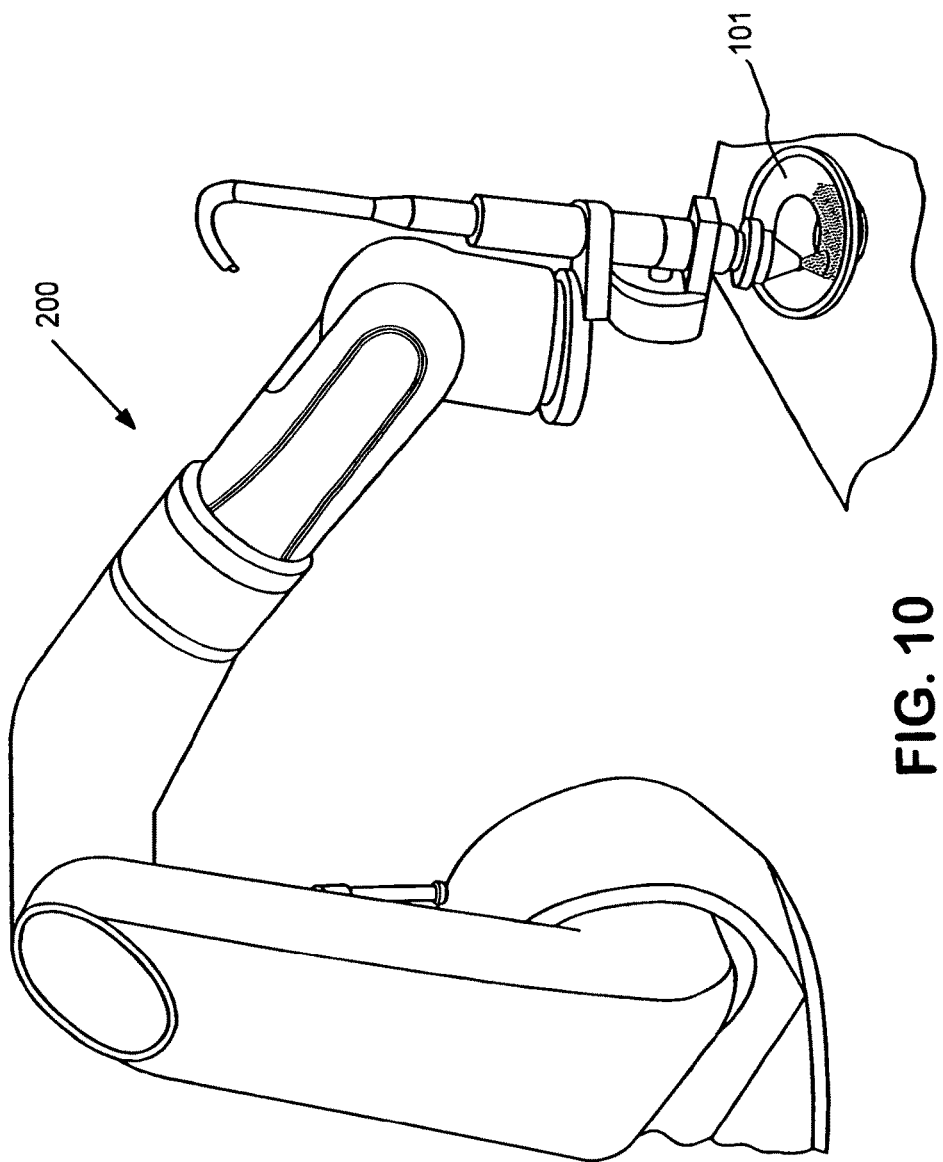
FIG. 10 is a perspective view of a robotic apparatus with the nozzle of FIG. 9 for coating the pump parts of FIGS. 3, 4 and 5 for instance.

FIG. 10 shows hard coating of an inlet suction liner 101 (FIG. 4) inlet of a pump using a robotic system 200. The outer diameter of the liner is 54 inches (134 cm) and the mass is 1.5 tons (1455 kg). This is a significant wear area in the pump of FIG. 6 as is the inlet pipe 202 of FIG. 6A. The separated pump parts are shown in FIG. 6B.

Figure 3:
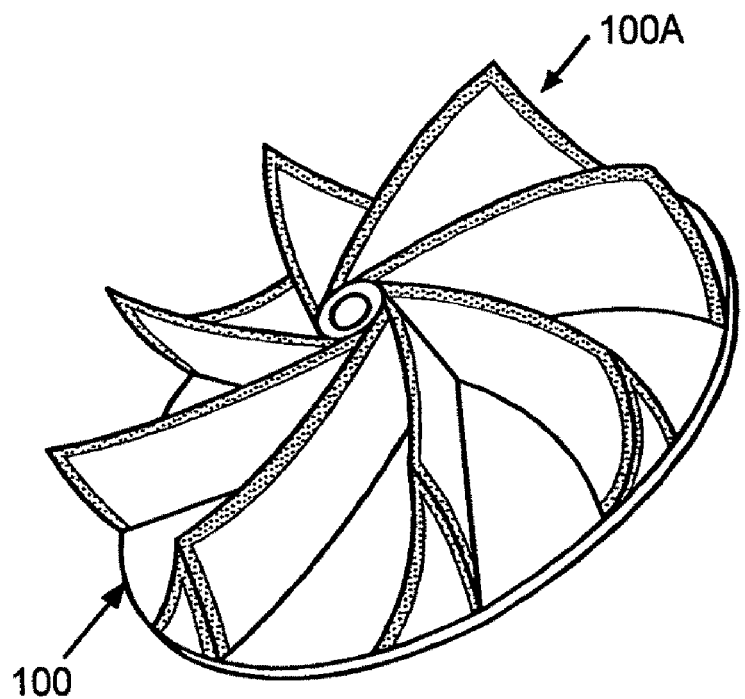
FIG. 3 shows a pump impeller 100 with the hard faced coating (dots) on the edges of vanes 100A (arrow).
Figure 5:
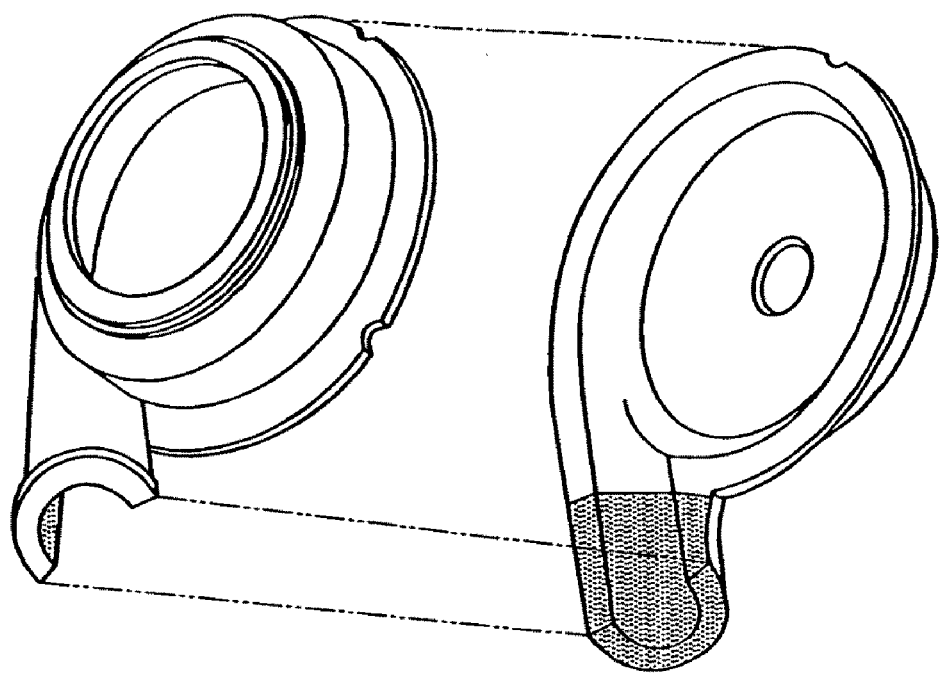
FIG. 5 is a perspective view showing a schematic of a pump housings 102 which has an inlet having the hard faced coating 102A (dots).

High productivity requires an appropriate robotic cladding unit and sufficient laser beam power; and capabilities to handle large and complex parts. For the pump impeller 100 (FIG. 3), and suction liner 101 (FIG. 4), and housing 102 (FIG. 5) the apparatus is robot system with a combined rotation axes (FIG. 10). Powder nozzles (FIG. 8) with the laser beam can be tilted to accommodate the article which in this case is a pump suction liner. This apparatus is essential for hard coating the impeller 100. This provides a solution for the suction liners 101 as well as impellers 100 and housings 102 in pumps as in FIGS. 3 to 5. FIG. 6 shows the pump 200 with pumping for the outlet in a system 201 and the inlet 202. The inlet and outlet pipes 201 and 202 to the pump of FIG. 6 are shown. FIGS. 6A and 6B show a coating around the inlet and outlet. The preferred horizontal slurry pumps are Weir Minerals (includes WARMAN) Weir Netherlands BV, the Netherlands, GIW Industries, Grovetown, Ga. and Sulzer Chemtech, Winterthur, Switzerland.

Figure 8:
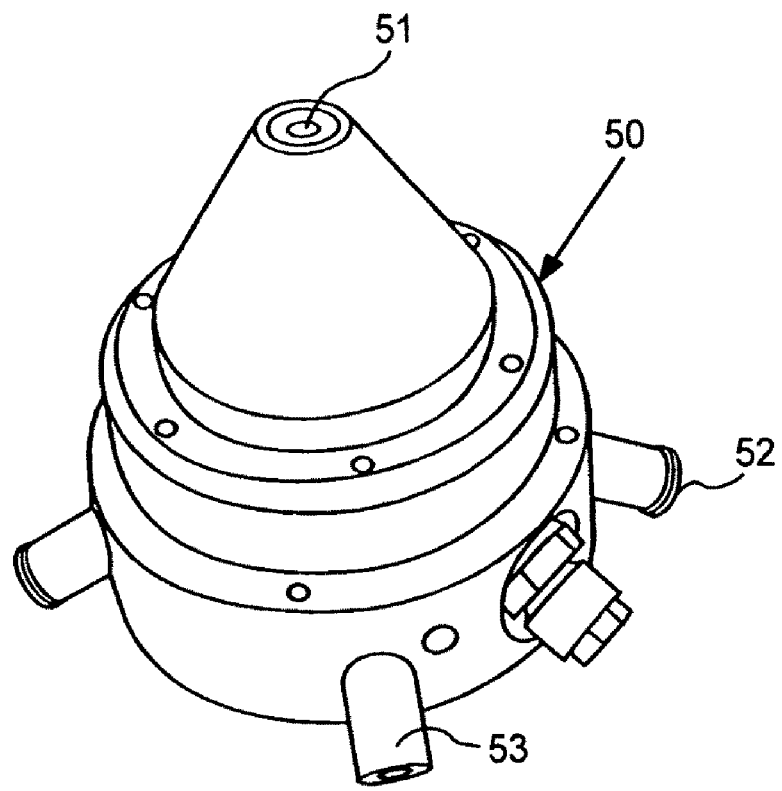
FIG. 8 is a perspective view of a commercial conical nozzle 50 of the type shown in FIG. 1. The connectors are for cooling water 53, powder and argon carrier gas 52 and extra gas shielding around the nozzle tip 51.

A coaxial cladding unit (Koax 8, Fraunhofer IWS, Dresden, Germany) such as shown in FIGS. 1, 2 and 8 can be used to coat the pump parts. For this unit: Optimal grain size—20 to 150 μm—other sizes are possible. Recommended powder feeding rates 2 to 10 g/min. The named rates refer to 1 kW laser power. Higher values are possible. Minimum powder focus—approximately 1.0 to 2 mm. distance nozzle—working surface—13 mm. Maximum power—4 kW (diode laser) higher laser power may decrease the long-term stability. Compatible laser —$CO_2$, Nd:YAG, diode laser. Dimensions—height: 80.0 mm; diameter: 78.0 mm. Note—The named values are recommendations, for which the cladding unit was optimized. Deviating values may possible but can harm the unit. Connection—4 connections for powder feeding, inclined; 1 connection for inert gas, inclined; 2 connections for cooling water (flow by room temperature); all connections for flexible tube with 6 mm external diameter. Included in delivery—X—Y—Z positioning unit; exchangeable flange for different focus distance; 1 exchangeable nozzle tip couple (water cooling also in the exchangeable nozzle tip).

It is intended that the foregoing description be only illustrative of the present invention and that the present invention be limited only by the hereinafter appended claims.

We claim:

1. An apparatus for hard faced surface coating of diamond particles in a metal matrix on a ferrous metal substrate containing carbon, which comprises:
    (a) a first support means for holding the ferrous metal substrate;
    (b) a device mounted on a second support means for delivering a laser beam on one axis towards the ferrous metal substrate to provide a heating zone on the ferrous metal substrate; and
    (c) a supply means nozzle which is mounted adjacent the first support means for supplying diamond particles and metal particles (i) in a rotating, diverging pattern that expands from a cyclone nozzle on the supply means and (ii) onto the ferrous metal substrate in the heating zone which is heated by the laser beam to provide the heat to fuse the metal particles to form the metal matrix on the ferrous metal substrate in the presence of a shield gas;
    (d) a means adjacent the heating zone for supplying the shield gas independent of the nozzle to prevent oxidation of the diamond and metal particles in the heating zone on the ferrous substrate,
    wherein:
    (i) the laser beam is capable of bonding the diamond particles to the metal matrix on the ferrous metal substrate at a temperature controlled so as to not degrade the diamond particles to provide the hard faced surface coating in the metal matrix as the hard faced surface coating, and
    (ii) the apparatus is adapted to deposit multiple tracks of the coating as the hard faced surface.

2. The apparatus of claim 1 adapted to provide the metal particles applied to the heating zone by moving the substrate on the first support means.

3. The apparatus of claim 1 adapted to provide the multiple tracks of the coating on the substrate which are adjacent to each other.

4. The apparatus of claim 1 adapted so that the multiple tracks of the coating on the substrate are overlapping.

5. The apparatus of claim 1 adapted so that the supply means nozzle, or the first support means is robotically driven or moved by a CNC controlled system or both are so driven.

6. The apparatus of claim 1 adapted so that the laser beam is delivered separately from the supply means nozzle for delivery of the diamond particles and the metal particles.

7. The apparatus of claim 1 wherein the device delivering the laser and supply means are both in the same nozzle.

* * * * *